(12) United States Patent
Byun et al.

(10) Patent No.: US 10,798,624 B2
(45) Date of Patent: Oct. 6, 2020

(54) METHOD AND APPARATUS FOR TRANSMITTING DATA IN CU-DU SPLIT SCENARIO

(71) Applicant: LG ELECTRONICS INC., Seoul (KR)

(72) Inventors: Daewook Byun, Seoul (KR); Jian Xu, Seoul (KR); Jaewook Lee, Seoul (KR); Seokjung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/064,832

(22) PCT Filed: Mar. 7, 2018

(86) PCT No.: PCT/KR2018/002680
§ 371 (c)(1),
(2) Date: Jun. 21, 2018

(87) PCT Pub. No.: WO2018/164469
PCT Pub. Date: Sep. 13, 2018

(65) Prior Publication Data
US 2019/0387444 A1 Dec. 19, 2019

Related U.S. Application Data

(60) Provisional application No. 62/467,830, filed on Mar. 7, 2017, provisional application No. 62/475,227, filed
(Continued)

(51) Int. Cl.
*H04W 36/02* (2009.01)
*H04W 36/00* (2009.01)
(Continued)

(52) U.S. Cl.
CPC ..... *H04W 36/023* (2013.01); *H04W 36/0072* (2013.01); *H04W 36/0083* (2013.01); *H04W 36/06* (2013.01); *H04W 88/08* (2013.01)

(58) Field of Classification Search
CPC ........... H04W 36/023; H04W 36/0072; H04W 36/0083; H04W 36/06; H04W 88/08
See application file for complete search history.

(56) References Cited

U.S. PATENT DOCUMENTS

2014/0378114 A1   12/2014  Lim et al.
2015/0087308 A1*   3/2015  Jeong ................ H04W 36/0022
                                                                                         455/436
(Continued)

FOREIGN PATENT DOCUMENTS

KR    1020100007946 A    1/2010
KR    10-2016-0126830 A  11/2016
WO    2015-105389 A      7/2015

OTHER PUBLICATIONS

ZTE, "Further Consideration on New RAN Aggregation Scenarios due to CUDU Split", R3-162705, 3GPP TSG RAN WG3 Meeting#94, Reno, USA, Nov. 18, 2016.
(Continued)

*Primary Examiner* — Kiet Tang
(74) *Attorney, Agent, or Firm* — Dentons US LLP

(57) ABSTRACT

Provided are a method in which a source distribution unit (DU) of a base station stops transmitting data to a user equipment (UE) in a wireless communication system, and an apparatus supporting the method. The method may include: receiving, from a central unit (CU) of the base station, a message indicating to stop transmitting data to the UE; and stopping transmitting data to the UE, upon receiving the message from the CU of the base station.

11 Claims, 19 Drawing Sheets

Related U.S. Application Data on Mar. 23, 2017, provisional application No. 62/488,076, filed on Apr. 21, 2017, provisional application No. 62/536,468, filed on Jul. 25, 2017, provisional application No. 62/555,050, filed on Sep. 7, 2017.

(51) Int. Cl.
| | | |
|---|---|---|
| *H04L 12/14* | (2006.01) | |
| *H04W 76/18* | (2018.01) | |
| *H04L 1/00* | (2006.01) | |
| *H04W 36/06* | (2009.01) | |
| *H04W 88/08* | (2009.01) | |

(56) References Cited

U.S. PATENT DOCUMENTS

| | | | | |
|---|---|---|---|---|
| 2015/0105062 | A1* | 4/2015 | Quan | H04W 8/24 455/418 |
| 2015/0189555 | A1 | 7/2015 | Ahluwalia | |
| 2015/0319654 | A1* | 11/2015 | Hayashi | H04L 12/14 370/331 |
| 2015/0326456 | A1* | 11/2015 | Dudda | H04L 43/062 370/252 |
| 2017/0135023 | A1* | 5/2017 | Jung | H04W 40/12 |
| 2018/0213589 | A1* | 7/2018 | Wu | H04W 36/14 |
| 2018/0249375 | A1* | 8/2018 | Goldhamer | H04L 1/0026 |
| 2019/0075498 | A1* | 3/2019 | Yiu | H04W 36/0022 |
| 2019/0273762 | A1* | 9/2019 | Soliman | H04W 76/18 |

OTHER PUBLICATIONS

Samsung, "Grouping of NR User Plane Functions and Placements in CUDU Split", R2-166506, 3GPP TSG-RAN WG2 Meeting #95bis, Kaohsiung, Taiwan, Sep. 30, 2016.
Samsung: "Intra-CU/Inter-DU Handover support", R3-171697, 3GPP TSG RAN WG3 Meeting #96, Hangzhou, China, May 15-19, 2017.
Intel Corp.: "Flow control enhancements for F1", R3-172299, 3GPP TSG RAN WG3 NR#2 Adhoc, Qingdao, China, Jun. 27-29, 2017.
Nokia: "F1 interface RAN3 stage 2—38.401", R3-171362, 3GPP TSG RAN WG3 Meeting #95-bis, Spokane, USA, Apr. 3-7, 2017.
Ericsson: "Description of solutions for centralised retransmission with Option 2", R3-171169, 3GPP TSG RAN WG3 Meeting #95-bis, Spokane, USA, Apr. 3-7, 2017.
Nokia: "Introduction of F1 User Plane protocol", R3-171438, 3GPP TSG RAN WG3 Meeting #96, Hangzhou, China, May 15-19, 2017.
Huawei: "UE context management on F1", R3-171852, 3GPP TSG RAN WG3 Meeting #96, Hangzhou, China, May 15-19, 2017.
Nokia: "TP of Inter-gNB-DU Mobility procedure (TS 38.401)", R3-172310, 3GPP TSG RAN WG3 AdHoc NR, Qingdao, China, Jun. 27-29, 2017.
Huawei, "SeNB Change and Data Forwarding", 3GPP TSG-RAN WG3 Meeting #83bis, Mar. 31-Apr. 4, 2014, R3-140568.
Qualcomm Incorporated, "Impacts of CU/DU split on NG and Xn interfaces", 3GPP TSG-RAN WG3 Meeting #94-NR, Jan. 17-19, 2017, R3-170165.
Catt, "TP for the protocol stack and functions of CU/DU interface", 3GPP TSG RAN WG3 Meeting #95, Feb. 13-17, 2017, R3-170383.
Ericsson, AT&T, Vodafone, "Separation of CP and UP", 3GPP TSG-RAN WG3 #96, May 15-19, 2017, R3-171725.
3rd Generation Partnership Project; Technical Specification Group Radio Access Network; Study on New Radio Access Technology; Radio Access Architecture and Interfaces (Release 14), 3GPP TR 38.801 V1.2.0, (Feb. 2017), Mar. 5, 2017, pp. 1-90, XP051290383.

\* cited by examiner

FIG. 10

| Bits | | | | | | | | Number of Octets |
|---|---|---|---|---|---|---|---|---|
| 7 | 6 | 5 | 4 | 3 | 2 | 1 | 0 | |
| PDU Type (=1) | | | | Highest Transmitted NR PDCP SN Ind. | Highest Delivered NR PDCP SN Ind. | Final Frame Ind. | Lost Packet Report | 1 |
| Spare | | | | | | | Cause Report | 1 |
| Desired buffer size for the data bearer | | | | | | | | 4 |
| Minimum desired buffer size for the UE | | | | | | | | 4 |
| Number of lost NR-U Sequence Number ranges reported | | | | | | | | 1 |
| Start of lost NR-U Sequence Number range | | | | | | | | 6* (Number of reported lost NR-U SN ranges) |
| End of lost NR-U Sequence Number range | | | | | | | | |
| Highest successfully delivered NR PDCP Sequence Number | | | | | | | | 3 |
| Highest transmitted NR PDCP Sequence Number | | | | | | | | 3 |
| Cause Value | | | | | | | | 1 |
| Spare extension | | | | | | | | 1-7 |

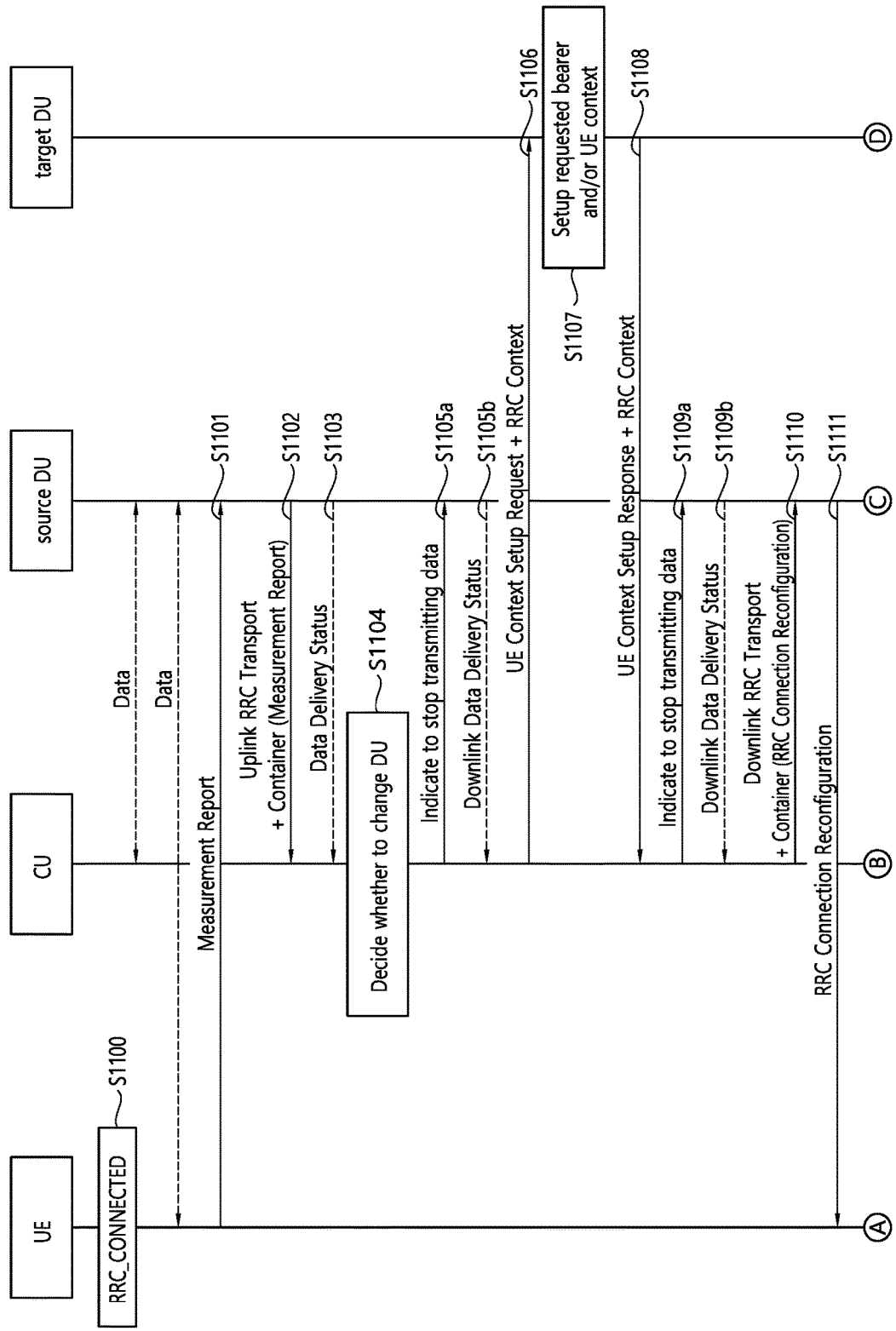

US 10,798,624 B2

METHOD AND APPARATUS FOR TRANSMITTING DATA IN CU-DU SPLIT SCENARIO

CROSS-REFERENCE TO RELATED APPLICATIONS

This application is the National Stage filing under 35 U.S.C. 371 of International Application No. PCT/KR2018/002680, filed on Mar. 7, 2018, which claims the benefit of U.S. Provisional Applications No. 62/467,830 filed on Mar. 7, 2017, No. 62/475,227 filed on Mar. 23, 2017, No. 62/488,076 filed on Apr. 21, 2017, No. 62/536,468 filed on Jul. 25, 2017 and No. 62/555,050 filed on Sep. 7, 2017, the contents of which are all hereby incorporated by reference herein in their entirety.

BACKGROUND OF THE INVENTION

Field of the Invention

The present invention relates to a wireless communication system, and more particularly, to a method of transmitting data in a scenario in which a central unit and distributed unit of a base station are split, and an apparatus supporting the method.

Related Art

In order to meet the demand for wireless data traffic soring since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post long-term evolution (LTE) system.

SUMMARY OF THE INVENTION

Meanwhile, in a case where a central unit (CU) and a distributed unit (DU) are split between a packet data convergence protocol (PDCP) layer and a radio link control (RLC) layer, when a user equipment (UE) changes the DU due to mobility of the UE, lost data may occur in a source DU. Therefore, there is a need to propose a procedure for retransmitting the lost data.

According to an embodiment, there is provided a method in which a source DU of a base station stops transmitting data to a UE in a wireless communication system. The method may include: receiving, from a CU of the base station, a message indicating to stop transmitting data to the UE; and stopping transmitting data to the UE upon receiving the message from the CU of the base station.

According to another embodiment, there is provided a source DU of a base station which stops transmitting data to a UE in a wireless communication system. The source DU may include: a memory; a transceiver; and a processor operatively coupling the memory and the transceiver, wherein the processor is configured to: control the transceiver to receive, from a CU of the base station, a message indicating to stop transmitting data to the UE; and control the transceiver to stop transmitting data to the UE upon receiving the message from the CU of the base station.

A data loss caused by mobility of a user equipment (UE) can be prevented.

BRIEF DESCRIPTION OF THE DRAWINGS

FIG. 10 shows an example of a downlink data delivery status frame according to an embodiment of the present invention.

FIG. 11a and FIG. 11b show a DU change procedure between adjacent DUs within the same CU according to an embodiment of the present invention.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G is an evolution of the LTE-A.

For clarity, the following description will focus on LTE-A. However, technical features of the present invention are not limited thereto.

Figure 1:
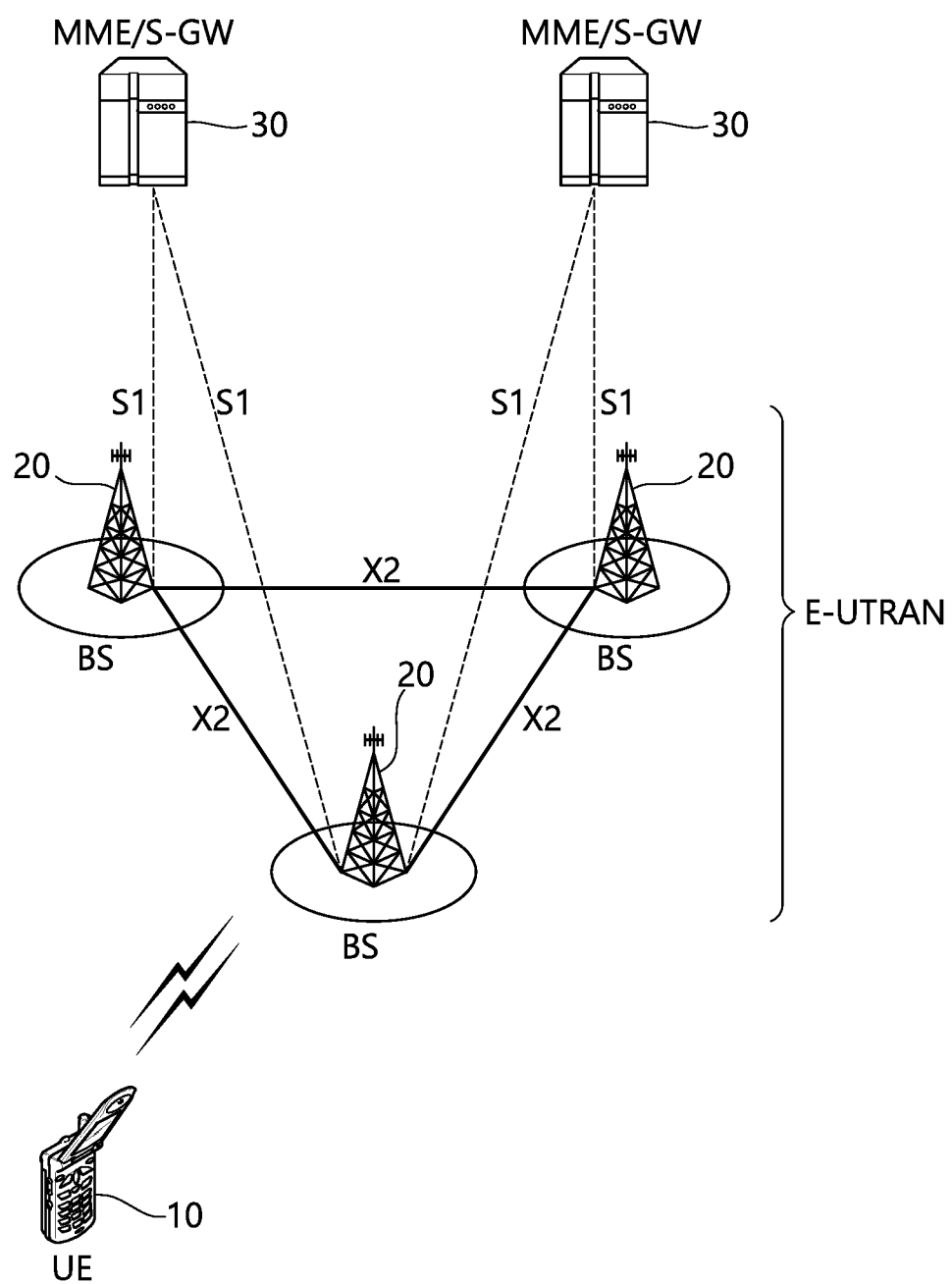
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
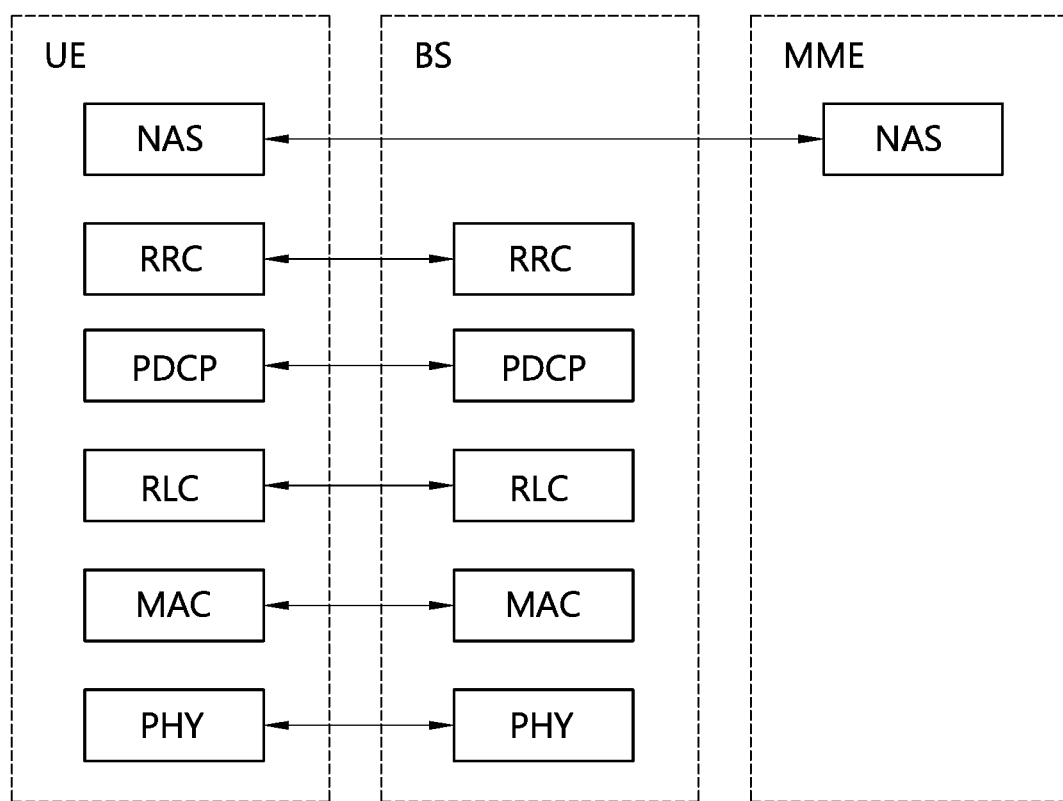
FIG. 2 shows a control plane of a radio interface protocol of an LTE system.
Figure 3:
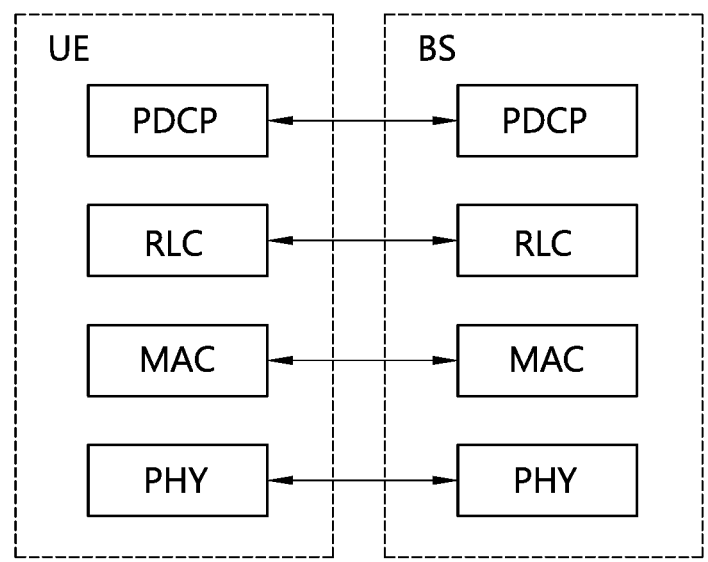
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel The PHY layer is connected to a medium access control (MAC) layer, which is a higher layer of the PHY layer, through a transport channel. A physical channel is mapped to the transport channel Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, a 5G network structure is described.

Figure 4:
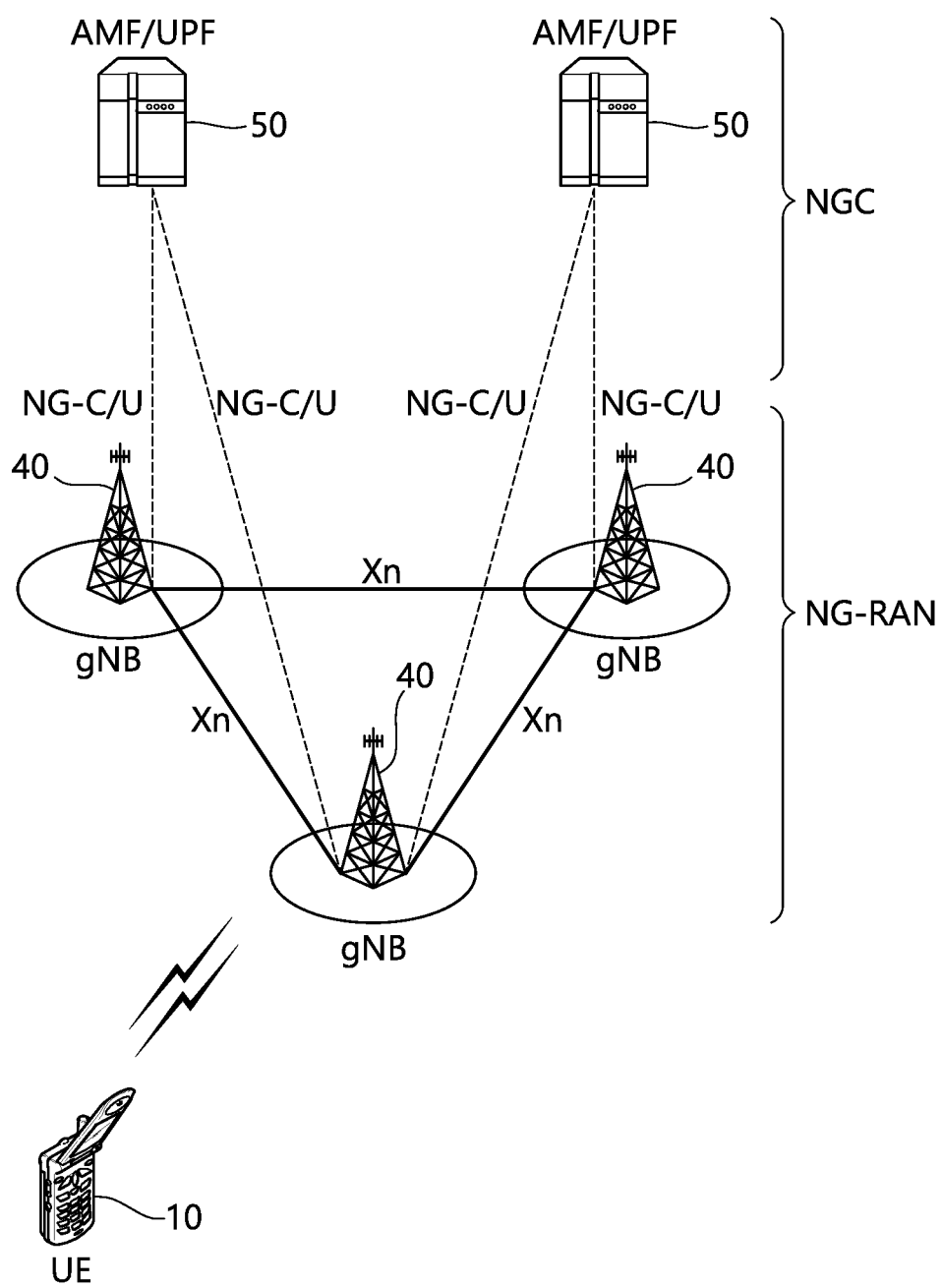
FIG. 4 shows a structure of a 5G system.

FIG. 4 shows a structure of a 5G system.

In case of an evolved packet core (EPC) having a core network structure of the existing evolved packet system (EPS), a function, a reference point, a protocol, or the like is defined for each entity such as a mobility management entity (MME), a serving gateway (S-GW), a packet data network gateway (P-GW), or the like.

On the other hand, in case of a 5G core network (or a NextGen core network), a function, a reference point, a protocol, or the like is defined for each network function (NF). That is, in the 5G core network, the function, the reference point, the protocol, or the like is not defined for each entity.

Referring to FIG. 4, the 5G system structure includes at least one UE 10, a next generation-radio access network (NG-RAN), and a next generation core (NGC).

The NG-RAN may include at least one gNB 40, and a plurality of UEs may be present in one cell. The gNB 40 provides the UE with end points of the control plane and the user plane. The gNB 40 is generally a fixed station that communicates with the UE 10 and may be referred to as another terminology, such as a base station (BS), a base transceiver system (BTS), an access point, or the like. One gNB 40 may be arranged in every cell. At least one cell may be present in a coverage of the gNB 40.

The NGC may include an access and mobility function (AMF) and a session management function (SMF) which are responsible for a function of a control plane. The AMF may be responsible for a mobility management function, and the SMF may be responsible for a session management function. The NGC may include a user plane function (UPF) which is responsible for a function of a user plane.

Interfaces for transmitting user traffic or control traffic may be used. The UE 10 and the gNB 40 may be connected by means of a Uu interface. The gNBs 40 may be interconnected by means of an X2 interface. Neighboring gNBs 40 may have a meshed network structure based on an Xn interface. The gNBs 40 may be connected to an NGC by means of an NG interface. The gNBs 40 may be connected to an AMF by means of an NG-C interface, and may be connected to a UPF by means of an NG-U interface. The NG interface supports a many-to-many-relation between the gNB 40 and the AMF/UPF 50.

A gNB host may perform functions such as functions for radio resource management, IP header compression and encryption of user data stream, selection of an AMF at UE attachment when no routing to an AMF can be determined from the information provided by the UE, routing of user plane data towards UPF(s), scheduling and transmission of paging messages (originated from the AMF), scheduling and transmission of system broadcast information (originated from the AMF or O&M), or measurement and measurement reporting configuration for mobility and scheduling.

An access and mobility function (AMF) host may perform primary functions such as NAS signalling termination, NAS signalling security, AS security control, inter CN node signalling for mobility between 3GPP access networks, idle mode UE reachability (including control and execution of paging retransmission), tracking area list management (for UE in idle and active mode), AMF selection for handovers with AMF change, access authentication, or access authorization including check of roaming rights.

A user plane function (UPF) host may perform primary functions such as anchor point for Intra-/inter-RAT mobility (when applicable), external PDU session point of interconnect to data network, packet routing & forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, UL/DL rate enforcement, uplink traffic verification (SDF to QoS flow mapping), transport level packet marking in the uplink and downlink, or downlink packet buffering and downlink data notification triggering.

A session management function (SMF) host may perform primary functions such as session management, UE IP address allocation and management, selection and control of UP function, configuring traffic steering at UPF to route traffic to proper destination, controlling part of policy enforcement and QoS, or downlink data notification.

Figure 5:
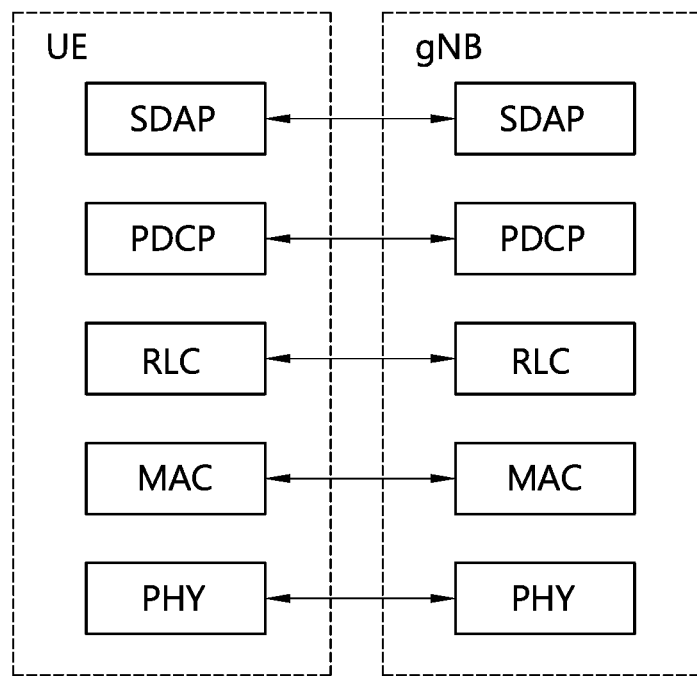
FIG. 5 shows a wireless interface protocol of a 5G system for a user plane.

FIG. 5 shows a wireless interface protocol of a 5G system for a user plane.

Referring to FIG. 5, the wireless interface protocol of the 5G system for the user plane may include a new layer called a service data adaptation protocol (SDAP) in comparison with an LTE system. A primary service and function of the SDAP layer includes mapping between quality of service (QoS) flow and a data radio bearer (DRB) and QoS flow ID (QFI) marking in both DL and UL packets. A single protocol entity of the SDAP may be configured for each individual PDU session, except for dual connectivity (DC) for which two entities can be configured.

Hereinafter, a 5G RAN deployment scenario will be described.

A 5G RAN may be classified into a 'non-centralized deployment' scenario, a 'co-sited deployment with E-UTRA' scenario, and a 'centralized deployment' scenario according to a shape of deploying a function of a BS in a central unit and a distributed unit and according to whether it coexists with a 4G BS. In this specification, the 5G RAN, a gNB, a next generation node B, a new RAN, and a new radio BS (NR BS) may imply a newly defined BS for 5G.

Figure 6:
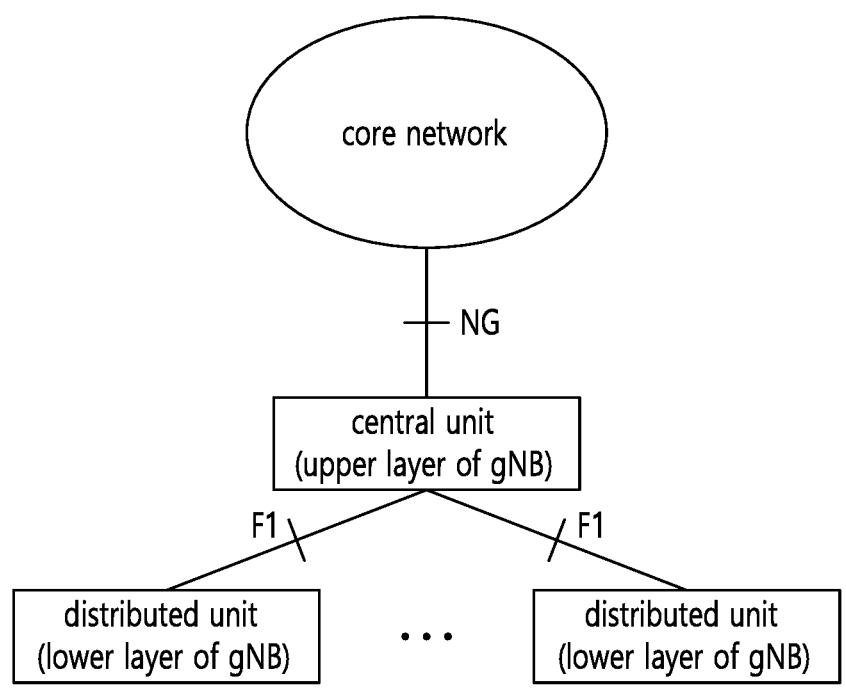
FIG. 6 shows a split-type gNB deployment (centralized deployment) scenario.

FIG. 6 shows a split-type gNB deployment (centralized deployment) scenario.

Referring to FIG. 6, a gNB may be split into a central unit and a distributed unit. That is, the gNB may be operated by being split in a layered manner. The central unit may perform a function of upper layers of the gNB, and the distributed unit may perform a function of lower layers of the gNB.

Figure 7:
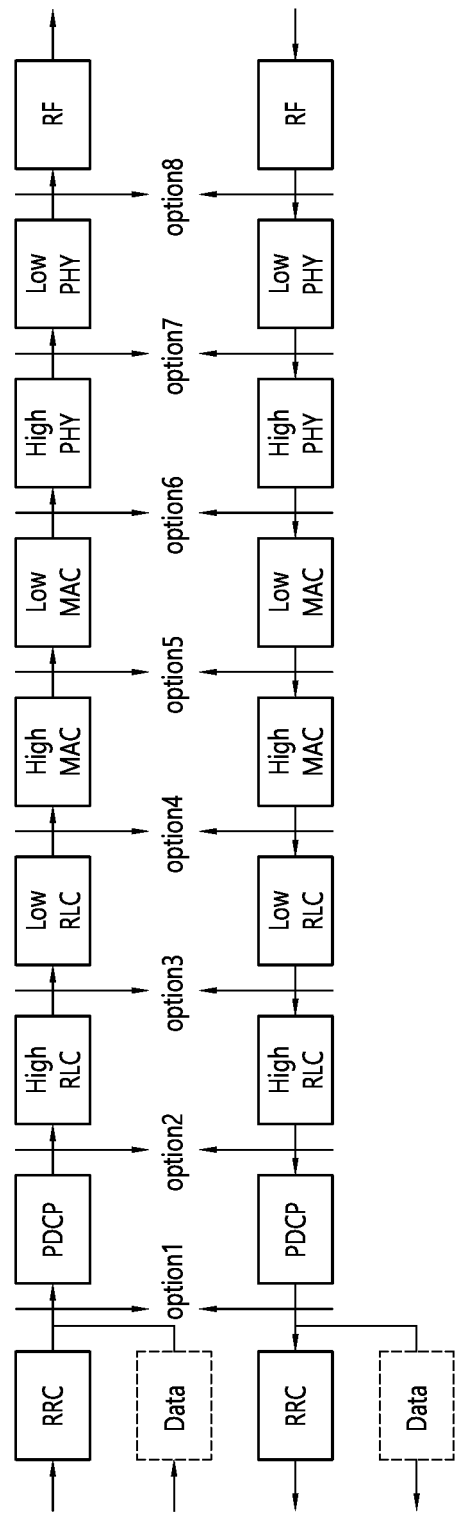
FIG. 7 shows a function split between a central unit and a distributed unit in a split-type gNB deployment scenario.

FIG. 7 shows a function split between a central unit and a distributed unit in a split-type gNB deployment scenario.

Referring to FIG. 7, in case of an option 1, an RRC layer is in a central unit, and an RLC layer, a MAC layer, a physical layer, and an RF are in a distributed unit. In case of an option 2, the RRC layer and the PDCP layer are in the central unit, and the RLC layer, the MAC layer, the physical layer, and the RF are in the distributed unit. In case of an option 3, the RRC layer, the PDCP layer, and an upper RLC layer are in the central unit, and a lower RLC layer, the MAC layer, the physical layer, and the RF are in the central unit. In case of an option 4, the RRC layer, the PDCP layer, and the RLC layer are in the central unit, and the MAC layer, the physical layer, and the RF are in the distributed unit. In case of an option 5, the RRC layer, the PDCP layer, the RLC layer, and an upper MAC layer are in the central unit, and a lower MAC layer, the physical layer, and the RF are in the distributed unit. In case of an option 6, the RRC layer, the PDCP layer, the RLC layer, and the MAC layer are in the central unit, and the physical layer and the RF are in the distributed unit. In case of an option 7, the RRC layer, the PDCP layer, the RLC layer, the MAC layer, and an upper physical layer are in the central unit, and a lower physical layer and the RF are in the distributed unit. In case of an option 8, the RRC layer, the PDCP layer, the RLC layer, the MAC layer, and the physical layer are in the central unit, and the RF is in the distributed unit.

Hereinafter, the central unit may be referred to as a CU, and the distributed unit may be referred to as a DU in the present specification. The CU may be a logical node which hosts a radio resource control (RRC), service data adaptation protocol (SDAP), and packet data convergence protocol (PDCP) layers of the gNB. The DU may be a logical node which hosts radio link control (RLC), media access control (MAC), and physical (PHY) layers of the gNB. Alternatively, the CU may be a logical node which hosts RRC and PDCP layers of an en-gNB.

Meanwhile, if the CU and the DU are split as in the option 2 of FIG. 7, a lost RLC PDU may occur in a source DU when a UE changes the DU due to its mobility of the UE.

Figure 8:
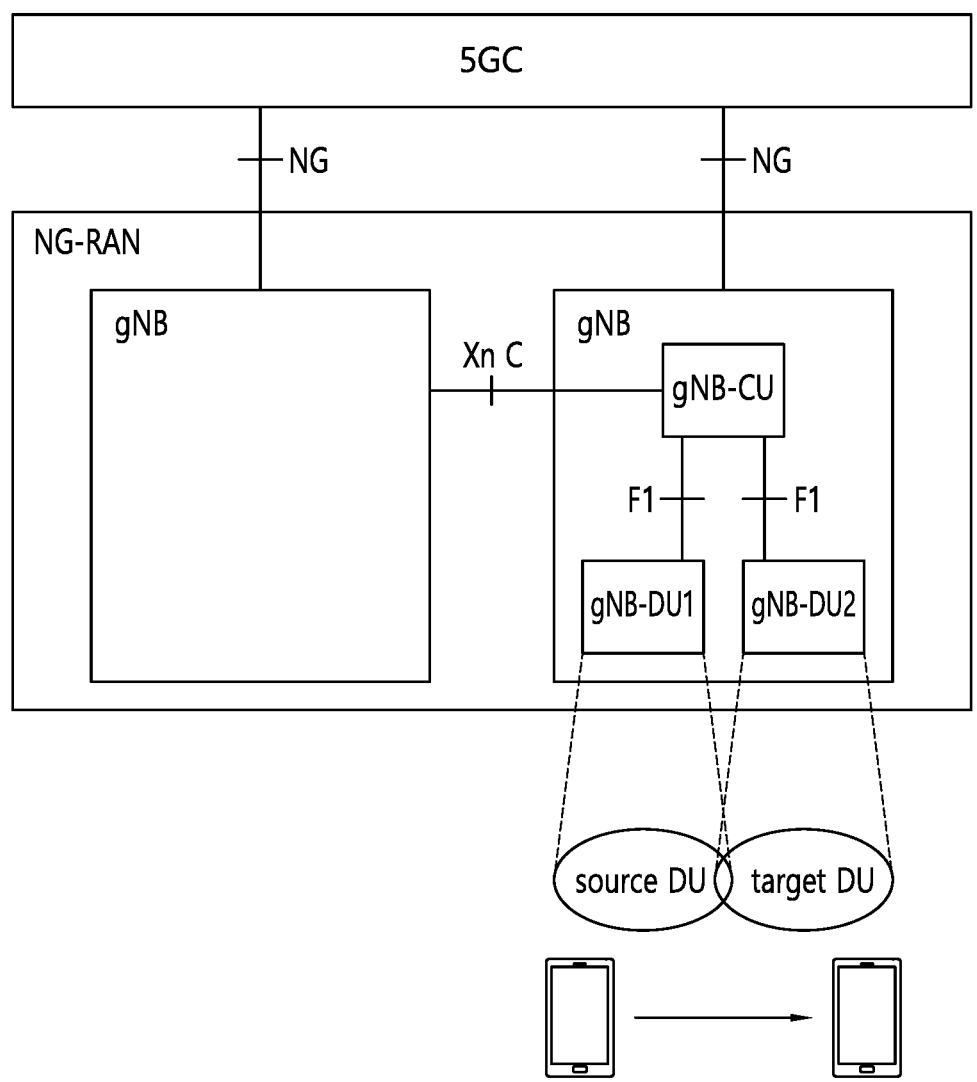
FIG. 8 shows a data loss which occurs in a source DU when a UE moves between adjacent DUs within the same CU.

FIG. 8 shows a data loss which occurs in a source DU when a UE moves between adjacent DUs within the same CU.

Referring to FIG. 8, it is assumed that a DU 1 and a DU 2 are controlled by the same CU, and a UE moves from a region of the DU 1 to a region of the DU 2. Therefore, the DU 1 may be a source DU, and the DU 2 may be a target DU. When the UE moves between adjacent DUs (e.g., from the DU 1 to the DU 2) within the same CU, a lost RLC PDU may occur in a source DU (i.e., DU 1), and the lost RLC PDU may need to be retransmitted by a target DU (i.e., DU 2). Therefore, in order to provide the lost RLC PDU to the UE, the target DU (e.g., DU 2) must know which RLC PDU is lost. However, since the source DU (i.e., DU 1) and the target DU (i.e., DU 2) are separated physically and there is no interface between them, the target DU (i.e., DU 2) cannot know which RLC PDU is lost in the source DU (i.e., DU 1). Therefore, the target DU (i.e., DU 2) cannot retransmit the lost RLC PDU occurring in the source DU (i.e., DU 1) to the UE. To solve the aforementioned problem, there is a need to propose a procedure for retransmitting the lost data. Hereinafter, a method of retransmitting lost data and an apparatus supporting the method are described according to an embodiment of the present invention.

Figure 9:
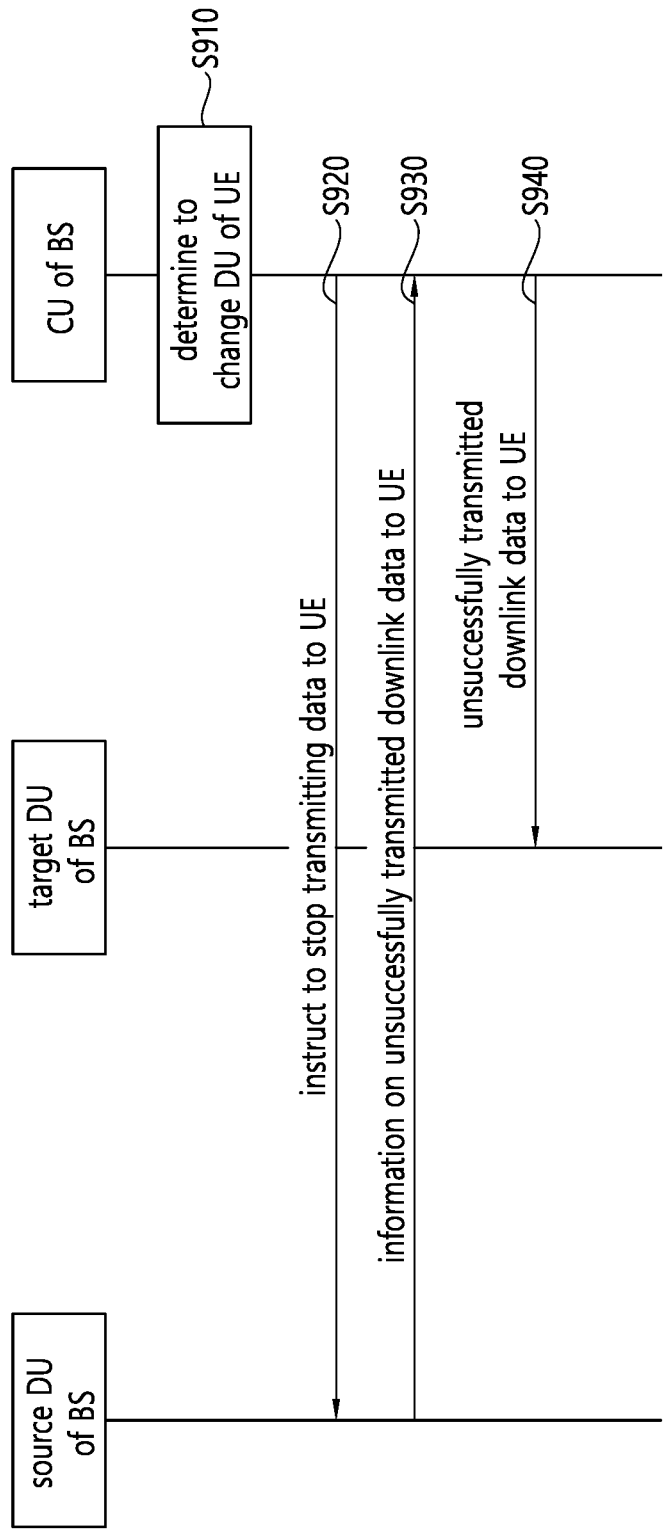
FIG. 9 shows a procedure in which a source DU of a gNB stops transmitting data to a UE according to an embodiment of the present invention.

FIG. 9 shows a procedure in which a source DU of a gNB stops transmitting data to a UE according to an embodiment of the present invention.

Referring to FIG. 9, in step S910, a CU may determine to change a DU of the UE from a source DU to a target DU. The source DU and the target DU may belong to the same CU.

In step S920, the CU may transmit to the source DU a message indicating to stop transmitting data to the UE. The message may be a UE context modification request message or a new message. For example, the UE context modification request message transmitted by the CU to provide the change of UE context information to the DU may be defined by Table 1.

TABLE 1

| IE/Group Name | Presence | Criticality | Assigned Criticality |
| --- | --- | --- | --- |
| Message Type | M | YES | reject |
| gNB-CU UE F1AP ID | M | YES | reject |
| gNB-DU UE F1AP ID | M | YES | reject |
| PSCell ID | O | YES | Ignore |
| DRX Cycle | O | YES | ignore |
| CU to DU RRC Information | O | YES | reject |
| Transmission Stop Indicator | O | YES | ignore |

Referring to Table 1, the UE context modification request message may include a Transmission Stop Indicator IE, and the Transmission Stop Indicator IE may instruct the DU to stop transmitting data to the UE.

In step S930, the source DU may stop transmitting data to the UE. In addition, the source DU may transmit, to the CU, information regarding unsuccessfully transmitted downlink data to the UE. The information may be included in a downlink data delivery status frame. For example, the information regarding the downlink data may be sequence numbers of PDCP PDU corresponding to lost RLC PDUs. For example, the information regarding the downlink data may be the highest PDCP PDU sequence number successfully delivered in sequence to the UE among those PDCP PDUs received from the CU.

FIG. 10 shows an example of a downlink data delivery status frame according to an embodiment of the present invention.

Referring to FIG. 10, the downlink data delivery status frame may include the highest NR PDCP PDU sequence number successfully delivered in sequence to the UE among those NR PDCP PDUs received from the node hosting the NR PDCP entity. The node hosting the NR PDCP entity may be a CU.

Returning to FIG. 9, in step S940, the CU may transmit to the target DU the unsuccessfully transmitted downlink data to the UE. The downlink data may be a downlink packet, and the downlink packet may include an unsuccessfully transmitted PDCP PDU to the UE from the source DU.

According to an embodiment of the present invention, when the UE moves from the source DU to the target DU, the unsuccessfully transmitted downlink data to the UE from the source DU may be transmitted quickly from the CU to the target DU.

Figure 11B:
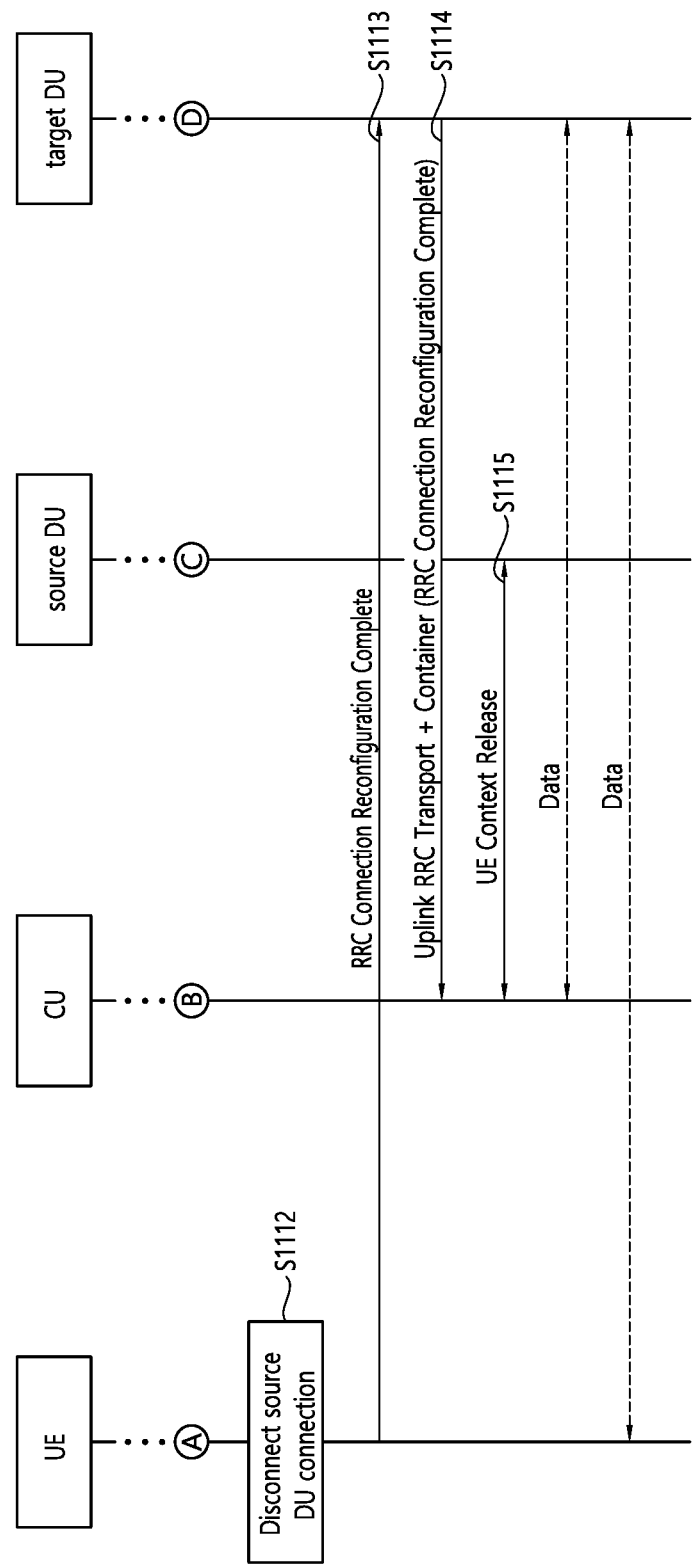

FIG. 11a and FIG. 11b show a DU change procedure between adjacent DUs within the same CU according to an embodiment of the present invention.

Referring to FIG. 11a, in step S1100, a UE may enter an RRC_CONNECTED state.

In step S1101, a measurement report message may be triggered and transmitted to a source DU.

In step S1102, the source DU may transmit to a CU a message including a container which piggybacks the measurement report message. The message may be an uplink RRC transport message or a new message.

In step S1103, the source DU may provide the CU with a feedback for the downlink data toward the UE.

In step S1104, upon receiving the measurement report message and the feedback from the source DU, the CU may determine to change a DU of the UE.

In step S1105a, the CU may transmit to the source DU the message indicating to stop transmitting data to the UE. The message may be a UE context modification request message, a DU change indication message, or a new message. In addition, the message may indicate that the source DU of the UE is changed. If the message must be transmitted after step S1108, steps S1105a and S1105b may be skipped.

In step S1105b, upon receiving the message from the CU, the source DU may stop transmitting the data to the UE and transmit a downlink data delivery status frame to the CU. The downlink data delivery status frame may be transmitted to inform the CU of unsuccessfully transmitted downlink data to the UE. That is, the source DU may provide the CU with a feedback for the downlink data toward the UE including the information on lost PDUs. For example, the information on lost PDUs may be sequence numbers of PDCP PDU corresponding to lost RLC PDUs. For example, the information on lost PDUs may be the highest PDCP PDU sequence number successfully delivered in sequence to the UE among those PDCP PDUs received from the CU. Therefore, the CU may know the unsuccessfully transmitted downlink data to the UE (e.g., a downlink packet including an unsuccessfully transmitted PDCP PDU to the source DU), and the downlink data may be transmitted from the CU to the target DU.

In step S1106, the CU may initiate the change of the DU by requesting the target DU to allocate a radio resource and/or create UE context for the UE. The change of the DU may be requested by a UE context setup procedure or a bearer setup procedure. That is, the CU may transmit a UE context setup request message or a bearer setup request message to the target DU. The CU may include the followings per bearer in the bearer setup request message or the UE context setup request message.

RB ID (e.g., SRB or DRB ID)
TNL address for the CU
Uplink tunnel endpoint identifier (TEID) for the CU
RLC configuration
Logical channel configuration In addition, the CU may include the followings in the bearer setup request message or the UE context setup request message.

CU UE F1AP ID
RRC context

The RRC context may contain information related to beam measurement, RSRQ, RSRP, RACH configuration, and/or RACH resource for the UE. All or a part of information may not be contained in the RRC context. In addition, when the CU receives the SgNB modification request message from the MeNB in an EN-DC case, the bearer setup request or the UE context setup request message may include RLC/MAC/PHY layer related information and/or radio resource configuration among information included in the RRC container provided by the MeNB. In addition, the UE context setup request message or the bearer setup request message may contain an indication to inform the target DU of either an inter-DU mobility case or the EN-DC case.

In step S1107, when the target DU receives the request message from the CU, the target DU may establish UE context and/or bearers requested for the UE, and may allocate a required resource on an F1 interface for the bearer requested to be established. In addition, for the UE, the target DU may allocate an RACH and beam related to the resource and may set an RACH configuration, on the basis of received information included or not included in RRC context.

In step S1108, to indicate that the requested bearer and/or UE context are established, the target DU may respond to the CU with a UE context setup response message or a bearer setup response message. The target DU may include the followings per bearer in the UE context setup response message or the bearer setup response message.

RB ID (e.g., SRB or DRB ID)
TNL address for the target DU
Downlink TEID for the target DU In addition, the target DU may contain the followings in the bearer setup response or the UE context setup response message.

RRC context

The RRC context may include information related to an allocated RACH resource, a set RACH configuration, and an allocated beam. All or a part of information may not be contained in the RRC context. Upon receiving the information included in the RRC container provided by the MeNB and/or an indication which indicates the EN-DC case, the target DU may include the radio resource related information corresponding to ones received or corresponding to the EN-DC case.

In step S1109a, if the CU receives the response message from the target DU and if steps 1105a and S1105b are skipped, the CU may transmit to the source DU a message indicating to stop transmitting data to the UE. The message may be a UE context modification request message, a DU change indication message, or a new message. In addition, the message may indicate that the source DU of the message is changed.

If the steps S1105a and S1105b are not skipped, the steps S1109a and S1109b may be skipped, and the CU may retransmit a PDCP PDU related to a lost RLC PDU for each bearer to the target DU on the basis of a feedback provided in step S1105b.

The CU may generate an RRC message to be provided to the UE. For example, the RRC message may be an RRC connection reconfiguration message. The RRC message may include RRC context received from the target DU.

In step S1109b, upon receiving the message from the CU, the source DU may stop transmitting the data to the UE and provide the CU with a downlink data delivery status frame. The downlink data delivery status frame may be transmitted to inform the CU of unsuccessfully transmitted downlink data to the UE. That is, the source DU may provide the CU with a feedback for downlink data towards the UE including information on lost PDUs. For example, the information on lost PDUs may be sequence numbers of PDCP PDU corresponding to lost RLC PDUs. For example, the information on lost PDUs may be the highest PDCP PDU sequence number successfully delivered in sequence to the UE among those PDCP PDUs received from the CU. Thereafter, the CU may retransmit to the target DU a PDCP PDU related to the lost RLC PDU for each bearer on the basis of the feedback. That is, the CU may know unsuccessfully transmitted downlink data to the UE (e.g., a downlink packet including an unsuccessfully transmitted PDCP PDU from the source DU), and the downlink data may be transmitted from the DU to the target DU.

In step S1110, the CU may transmit to the source DU a message including a container which piggybacks the RRC connection reconfiguration message. The message may be a downlink RRC transport message or a new message. If steps S1105a and S1106b are skipped or if steps S1109a and S1109b are skipped, an indication to stop transmitting data to the UE and provide the CU with a feedback for the downlink data toward the UE may be contained in this message.

In step S1111, upon receiving the message from the CU, the source DU may transmit the RRC connection reconfiguration message to the UE. If the source DU receives an indication from the CU in step S1110, the source DU may stop transmitting data to the UE and may provide the CU with the feedback for downlink data toward the UE. The feedback may include the information on lost PDUs. For example, the information on lost PDUs may be sequence numbers of PDCP PDU corresponding to lost RLC PDUs. For example, the information on lost PDUs may be the highest PDCP PDU sequence number successfully delivered in sequence to the UE among those PDCP PDUs received from the CU. Thereafter, the CU may retransmit to the target DU a PDCP PDU related to the lost RLC PDU for each bearer on the basis of the feedback. That is, the CU may know unsuccessfully transmitted downlink data to the UE (e.g., a downlink packet including an unsuccessfully transmitted PDCP PDU from the source DU), and the downlink data may be transmitted from the DU to the target DU.

Referring to FIG. 11b, in step S1112, the UE may disconnect the connection with the source DU.

In step S1113, the UE may transmit the RRC connection reconfiguration complete message to the target DU.

In step S1114, the target DU may transmit to the CU a message including a container which piggybacks the RRC connection reconfiguration complete message. The message may be an uplink RRC transport message or a new message.

In step S1115, if the CU receives the message from the target DU, the CU may trigger a UE context release procedure or bearer release procedure towards the UE in order to release a radio resource and/or UE context for the UE.

According to an embodiment of the present invention, the CU may instruct the source DU having the F1 connection to stop transmitting downlink data before the CU triggers the RRC connection reconfiguration procedure. In addition, the source DU may provide a feedback for downlink data. Therefore, when the UE moves from the source DU to the target DU, unsuccessfully transmitted downlink data to the UE from the source DU (e.g., a PDCP PDU related to lost RLC PDUs occurring in the source DU) may be retransmitted quickly from the CU to the target DU. In addition, signalling for DU change may be reduced or minimized Therefore, this invention can make the UE's experience better (e.g. smooth and seamless DU change or handover) and facilitate a RAN node to handle data packets better during the DU change or the handover.

Figure 12:
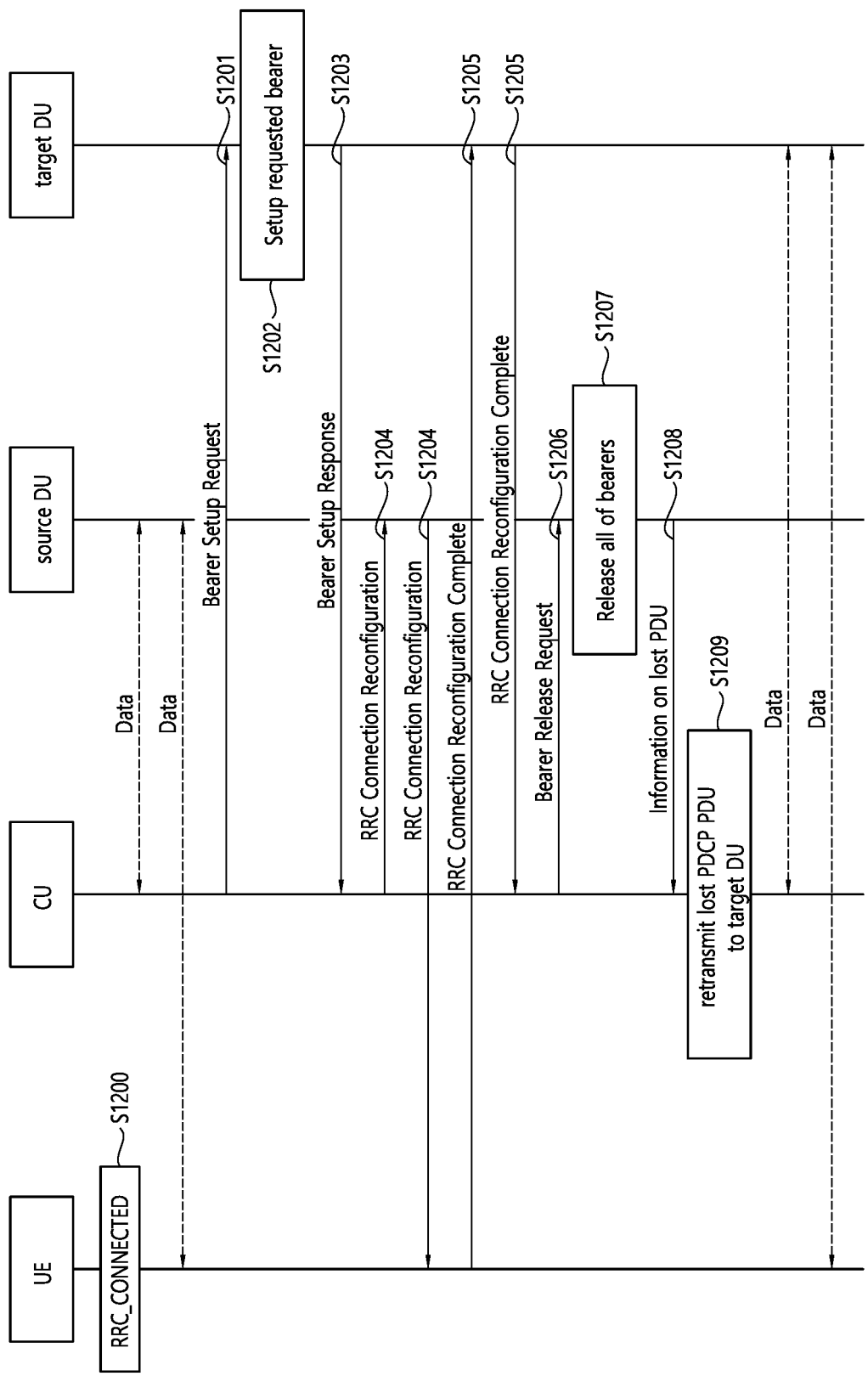
FIG. 12 shows a DU change procedure between adjacent DUs within the same CU according to an embodiment of the present invention.

FIG. 12 shows a DU change procedure between adjacent DUs within the same CU according to an embodiment of the present invention.

Referring to FIG. 12, in step S1200, a UE may enter an RRC_CONNECTED state.

In step S1201, the CU may initiate the change of the DU by requesting the target DU to allocate a radio resource for the UE. The change of the DU may be requested by a bearer setup procedure. That is, the CU may transmit a bearer setup request message to the target DU. The CU may include the followings per bearer in the bearer setup request message.

RB ID (e.g., SRB or DRB ID)
TNL address for the CU
Uplink TEID for the CU
RLC configuration
Logical channel configuration In step S1202, when the target DU receives the request message from the CU, the target DU may establish bearers requested for the UE, and may allocate a required resource on an F1 interface for the bearer requested to be established.

In step S1203, to indicate that the requested bearer is established, the target DU may respond to the CU with a UE context setup response message or a bearer setup response message. The target DU may include the followings per bearer in the bearer setup response message.

RB ID (e.g., SRB or DRB ID)
TNL address for the target DU
Downlink TEID for the target DU In step S1204, if the CU receives a response message from the target DU, the CU may transmit the RRC connection reconfiguration message including new configuration for accessing the target DU. The RRC connection reconfiguration message may be transmitted to the UE via the source DU.

In step S1205, the UE may transmit the RRC connection reconfiguration complete message to the CU via the target DU.

In step S1206, if the CU receives the complete message from the UE, the CU may trigger the bearer release procedure by requesting the source DU to release a radio resource for the UE.

In step S1207, if the source DU receives a bearer release request message, the source DU may release all of bearers for the UE and the corresponding resources on an F1 interface.

In step S1208, the source DU may transmit to the CU a message including information on lost PDUs. The message may be a lost PDU indication message or a bearer release response message. The information on the lost PDU may be provided per bearer. For example, the information on lost PDUs may be sequence numbers of PDCP PDU corresponding to lost RLC PDUs. For example, the information on lost PDUs may be the highest PDCP PDU sequence number successfully delivered in sequence to the UE among those PDCP PDUs received from the CU.

In step S1209, if the CU receives the message from the source DU, the CU may provide the target DU with the lost PDCP PDU on the basis of the information on lost PDUs contained in the received message.

According to an embodiment of the present invention, the source DU may inform the CU, which has the F1 connection, of information on the lost PDCP PDU corresponding to the lost RLC PDU for a specific UE when there is a change in DUs in the same CU due to UE's mobility. Therefore, when the UE moves from the source DU to the target DU, unsuccessfully transmitted downlink data to the UE from the source DU (e.g., a PDCP PDU related to lost RLC PDUs occurring in the source DU) may be retransmitted quickly from the CU to the target DU. Therefore, this invention can make the UE's experience better (e.g. smooth and seamless DU change or handover) and facilitate a RAN node to handle data packets better during the DU change or the handover.

Figure 13A:
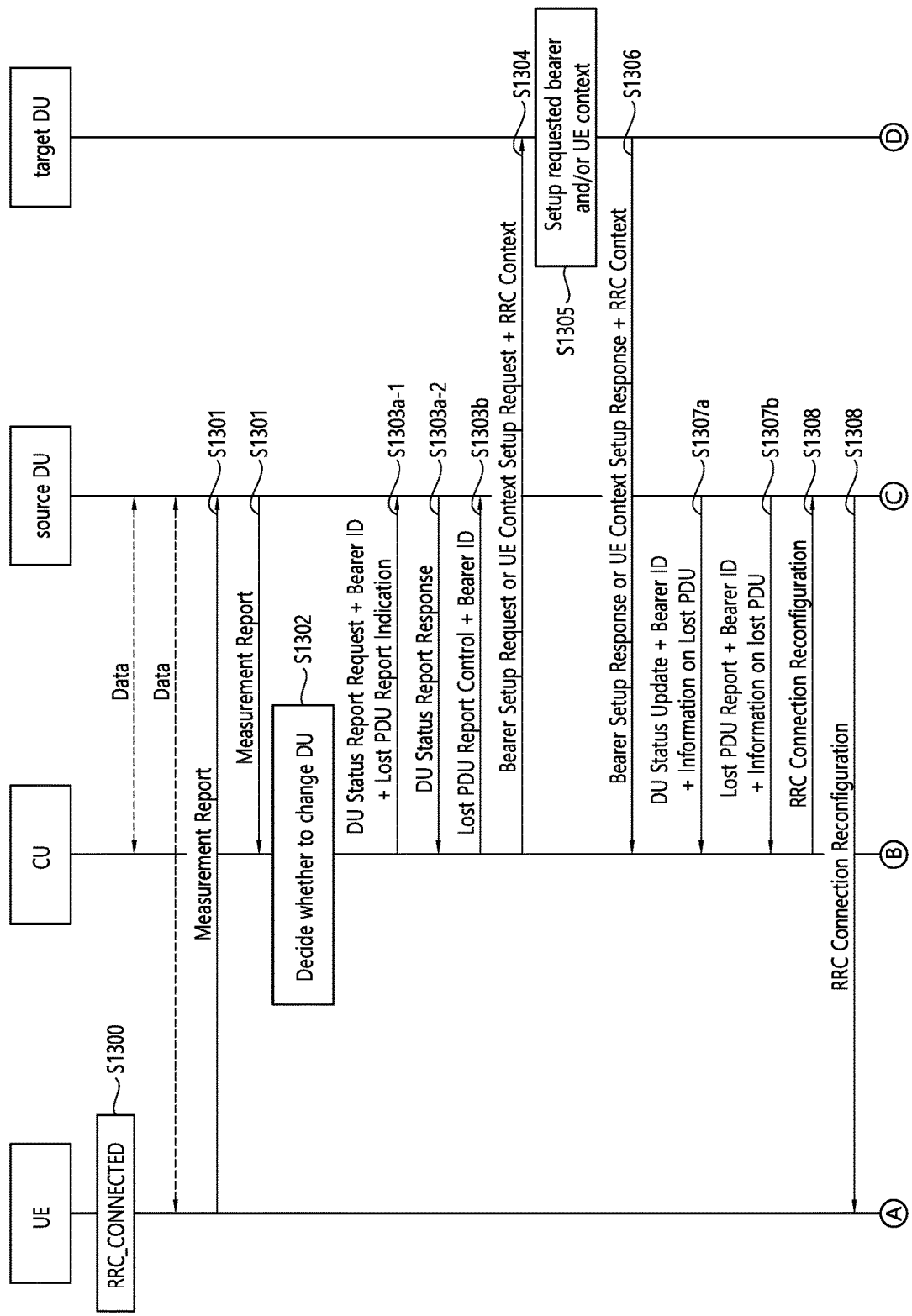
FIG. 13a and FIG. 13b show a DU change procedure between adjacent DUs within the same CU according to an embodiment of the present invention.
Figure 13B:
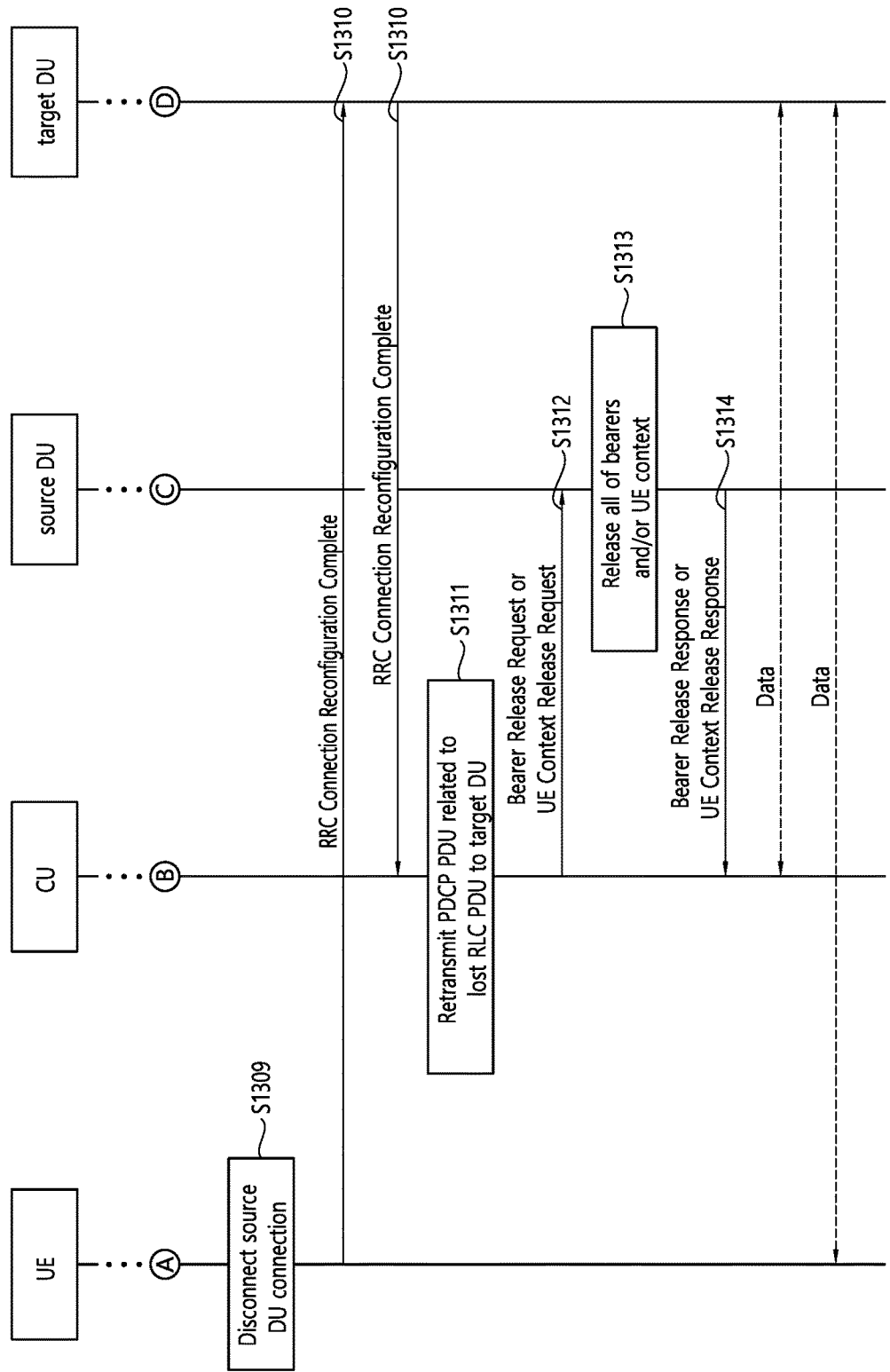

FIG. 13a and FIG. 13b show a DU change procedure between adjacent DUs within the same CU according to an embodiment of the present invention.

Referring to FIG. 13a, in step S1300, a UE may enter an RRC_CONNECTED state.

In step S1301, a measurement report message may be triggered and transmitted to a source DU via a source DU. In an F1 interface, the measurement report message may be transmitted by using a container included in an uplink RRC transport message or a new message.

In step S1302, the CU may determine to change a DU of the UE on the basis of the measurement report message.

In step S1303a-1, the CU may transmit to the source DU a DU status reporting request message or a new message. The message may include a bearer ID (e.g., a radio bearer ID) and a lost PDU reporting indication. The message may be transmitted to request for reporting a lost PDU to the CU per bearer provided to the UE which performs the DU change when the RLC PDU is lost.

In step S1303a-2, if the source DU receives a request message from the CU, the source DU may report when the RLC PDU transmitted to the UE is lost for each bearer.

In step S1303b, the CU may transmit to the source DU a lost PDU reporting control message or a new message. The message may include a bearer ID (e.g., a radio bearer ID). The message may be transmitted to request for reporting a lost PDU to the CU when the RLC PDU is lost. If the source DU receives a request message from the CU, the source DU may report when the RLC PDU transmitted to the UE is lost for each bearer.

In step S1304, the CU may initiate the change of the DU by requesting the target DU to allocate a radio resource and/or create UE context for the UE. The change of the DU may be requested by a UE context setup procedure or a bearer setup procedure. That is, the CU may transmit a UE context setup request message or a bearer setup request message to the target DU. The CU may include the followings per bearer in the bearer setup request message or the UE context setup request message.

RB ID (e.g., SRB or DRB ID)
  TNL address for the CU
  Uplink TEID for the CU
  RLC configuration
  Logical channel configuration In addition, the CU may include the followings in the bearer setup request message or the UE context setup request message.

CU UE F1AP ID
  RRC context

The RRC context may contain information related to beam measurement, RSRQ, RSRP, RACH configuration, and/or RACH resource for the UE. All or a part of information may not be contained in the RRC context.

In step S1305, when the target DU receives the request message from the CU, the target DU may establish UE context and/or bearers requested for the UE, and may allocate a required resource on an F1 interface for the bearer requested to be established. In addition, for the UE, the target DU may allocate an RACH and beam related to the resource and may set an RACH configuration, on the basis of received information included or not included in RRC context.

In step S1306, to indicate that the requested bearer and/or UE context are established, the target DU may respond to the CU with a UE context setup response message or a bearer setup response message. The target DU may include the followings per bearer in the UE context setup response message or the bearer setup response message.

RB ID (e.g., SRB or DRB ID)
  TNL address for the target DU
  Downlink TEID for the target DU In addition, the target DU may contain the followings in the bearer setup response or the UE context setup response message.

RRC context

The RRC context may include information related to an allocated RACH resource, a set RACH configuration, and an allocated beam. All or a part of information may not be contained in the RRC context.

In step S1307a, when the RLC PDU is lost for the bearer after step S1303a-2, the source DU may transmit to the CU a new message or a DU status update message including a bearer ID (e.g., a radio bearer ID) and information on lost PDUs. For example, the information on lost PDUs may be sequence numbers of PDCP PDU corresponding to lost RLC PDUs. For example, the information on lost PDUs may be the highest PDCP PDU sequence number successfully delivered in sequence to the UE among those PDCP PDUs received from the CU. The information on the lost PDUs may be provided per bearer. Step S1307a may be performed between step S1304 and step S1306.

In step S1307b, when the RLC PDU is lost for the bearer after step S1303b, the source DU may transmit to the CU a new message or a lost PDU report message including a bearer ID (e.g., a radio bearer ID) and information on lost PDUs. For example, the information on lost PDUs may be sequence numbers of PDCP PDU corresponding to lost RLC PDUs. For example, the information on lost PDUs may be the highest PDCP PDU sequence number successfully delivered in sequence to the UE among those PDCP PDUs received from the CU. The information on the lost PDUs may be provided per bearer. Step S1307b may be performed between step S1304 and step S1306.

In step S1308, if the CU receives the bearer setup response or the UE context setup response message from the target DU, the CU may transmit the RRC connection reconfiguration message including a new configuration (e.g., RRC context received from the target DU) for accessing the target DU. The RRC connection reconfiguration message may be transmitted to the UE via the source DU. The RRC connection reconfiguration message may be transmitted using a container included in a downlink RRC transport or a new message.

Referring to FIG. 13b, in step S1309, the UE may disconnect the connection with the source DU.

In step S1310, the UE may transmit the RRC connection reconfiguration complete message to the CU via the target DU. The RRC connection reconfiguration complete message may be transmitted using a container included in an uplink RRC transport or a new message.

In step S1311, if the CU receives the RRC connection reconfiguration complete message from the UE, the CU may retransmit to the target DU a PDCP PDU related to the lost RLC PDU for each bearer on the basis of a bearer ID and information on the lost PDU per bearer received in step S1307a or S1307b.

In step S1312, if the CU receives the RRC connection reconfiguration complete message from the UE, the CU may trigger a bearer release procedure or UE context release procedure by requesting the source DU to release a radio resource and/or UE context for the UE.

In step S1313, upon receiving a bearer release request message or a UE context release request message, the source DU may release all of bearers and/or UE context for the UE and corresponding resources on an F1 interface.

In step S1314, the source DU may transmit a bearer release response or a UE context release response message to the CU.

According to an embodiment of the present invention, the source DU may inform the CU, which has the F1 connection, of information on the lost PDCP PDU corresponding to the lost RLC PDU for a specific UE when there is a change in DUs in the same CU due to UE's mobility. Therefore, when the UE moves from the source DU to the target DU, unsuccessfully transmitted downlink data to the UE from the source DU (e.g., a PDCP PDU related to lost RLC PDUs occurring in the source DU) may be retransmitted quickly from the CU to the target DU. Therefore, this invention can make the UE's experience better (e.g. smooth and seamless DU change or handover) and facilitate a RAN node to handle data packets better during the DU change or the handover.

Figure 14A:
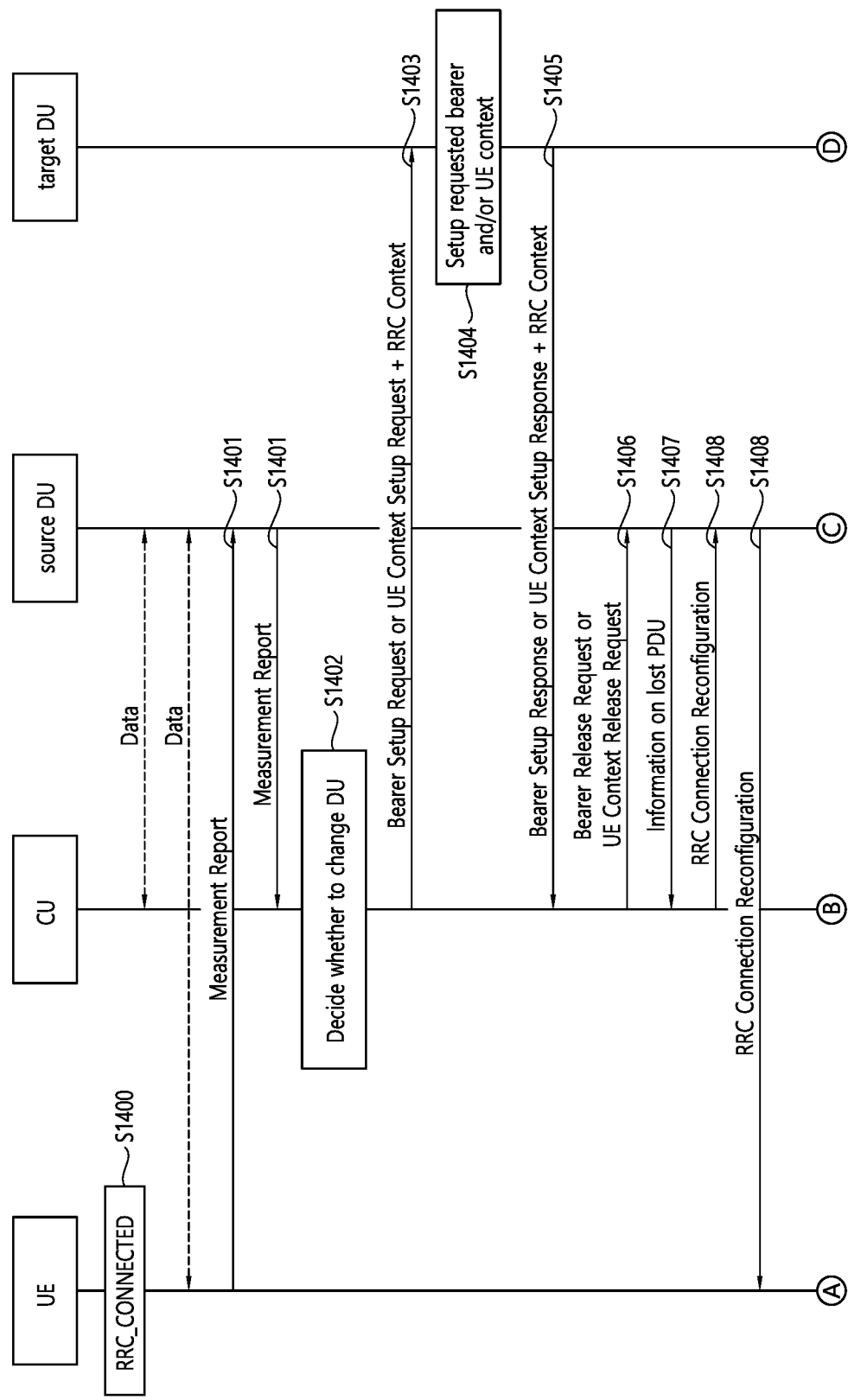
FIG. 14a and FIG. 14b show a DU change procedure between adjacent DUs within the same CU according to an embodiment of the present invention.
Figure 14B:
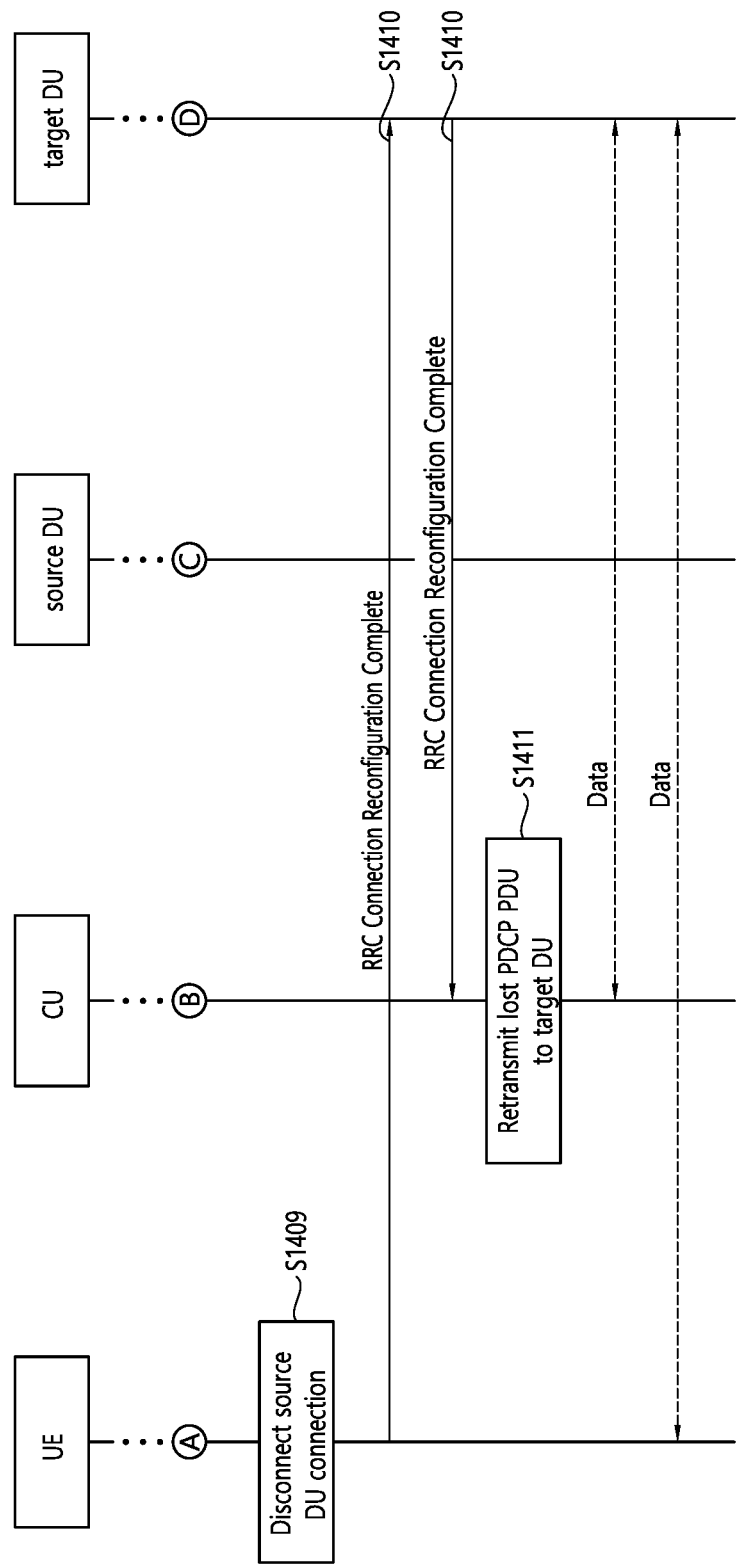

FIG. 14a and FIG. 14b show a DU change procedure between adjacent DUs within the same CU according to an embodiment of the present invention.

Referring to FIG. 14a, in step S1400, a UE may enter an RRC_CONNECTED state.

In step S1401, a measurement report message may be triggered and transmitted to a source DU via a source DU. In an F1 interface, the measurement report message may be transmitted by using a container included in an uplink RRC transport message or a new message.

In step S1402, the CU may determine to change a DU of the UE on the basis of the measurement report message.

In step S1403, the CU may initiate the change of the DU by requesting the target DU to allocate a radio resource and/or create UE context for the UE. The change of the DU may be requested by a UE context setup procedure or a bearer setup procedure. That is, the CU may transmit a UE context setup request message or a bearer setup request message to the target DU. The CU may include the followings per bearer in the bearer setup request message or the UE context setup request message.
  RB ID (e.g., SRB or DRB ID)
  TNL address for the CU
  Uplink TEID for the CU
  RLC configuration
  Logical channel configuration In addition, the CU may include the followings in the bearer setup request message or the UE context setup request message.
  CU UE F1AP ID
  RRC context The RRC context may contain information related to beam measurement, RSRQ, RSRP, RACH configuration, and/or RACH resource for the UE. All or a part of information may not be contained in the RRC context.

In step S1404, when the target DU receives the request message from the CU, the target DU may establish UE context and/or bearers requested for the UE, and may allocate a required resource on an F1 interface for the bearer requested to be established. In addition, for the UE, the target DU may allocate an RACH and beam related to the resource and may set an RACH configuration, on the basis of received RRC context.

In step S1405, to indicate that the requested bearer and/or UE context are established, the target DU may respond to the CU with UE context setup response message or a bearer setup response message. The target DU may include the followings per bearer in the UE context setup response message or the bearer setup response message.
  RB ID (e.g., SRB or DRB ID)
  TNL address for the target DU
  Downlink TEID for the target DU In addition, the target DU may contain the followings in the bearer setup response or the UE context setup response message.
  RRC context The RRC context may include information related to an allocated RACH resource, a set RACH configuration, and an allocated beam. All or a part of information may not be contained in the RRC context.

In step S1406, if the CU receives a response message from the target DU, the CU may transmit a UE context release request message or a bearer release request to the source DU to release a radio resource and/or UE context for the UE.

In step S1407, upon receiving the UE context release request message or the bearer release request message, the source DU may transmit to the CU a message including information on a lost PDU and a bearer ID. The message may be a lost PDU indication message, a bearer release response message, or a UE context release response message. The information on the lost PDU and the bearer ID may be provided per bearer. For example, the information for the bearer ID may be a radio bearer ID. For example, the information on the lost PDU may be sequence numbers of PDCP PDU corresponding to lost RLC PDUs. For example, the information on the lost PDU may be the highest PDCP PDU sequence number successfully delivered in sequence to the UE among those PDCP PDUs received from the CU. In addition, the source DU may release all of bearers and/or UE context for the UE and corresponding resources on an F1 interface.

In step S1408, if the CU receives a message from the source DU, the CU may transmit an RRC connection reconfiguration message including a new configuration (e.g., RRC context received from the target DU) for accessing the target DU. The RRC connection reconfiguration message may be transmitted to the UE via the source DU. The RRC connection reconfiguration message may be transmitted using a container included in a downlink RRC transport or a new message.

Referring to FIG. 14b, in step S1409, the UE may disconnect the connection with the source DU.

In step S1410, the UE may transmit the RRC connection reconfiguration complete message to the CU via the target DU. The RRC connection reconfiguration complete message may be transmitted using a container included in an uplink RRC transport or a new message.

In step S1411, if the CU receives the RRC connection reconfiguration complete message from the UE, the CU may retransmit to the target DU a PDCP PDU related to the lost RLC PDU for each bearer on the basis of a bearer ID and information on the lost PDU per bearer received in step S1407.

According to an embodiment of the present invention, the source DU may inform the CU, which has the F1 connection, of information on the lost PDCP PDU corresponding to the lost RLC PDU for a specific UE when there is a change in DUs in the same CU due to UE's mobility, before the CU triggers the RRC connection reconfiguration procedure. Therefore, when the UE moves from the source DU to the target DU, unsuccessfully transmitted downlink data to the UE from the source DU (e.g., a PDCP PDU related to lost RLC PDUs occurring in the source DU) may be retransmitted quickly from the CU to the target DU. In addition, signalling for DU change may be reduced or minimized. Therefore, this invention can make the UE's experience better (e.g. smooth and seamless DU change or handover) and facilitate a RAN node to handle data packets better during the DU change or the handover.

Figure 15:
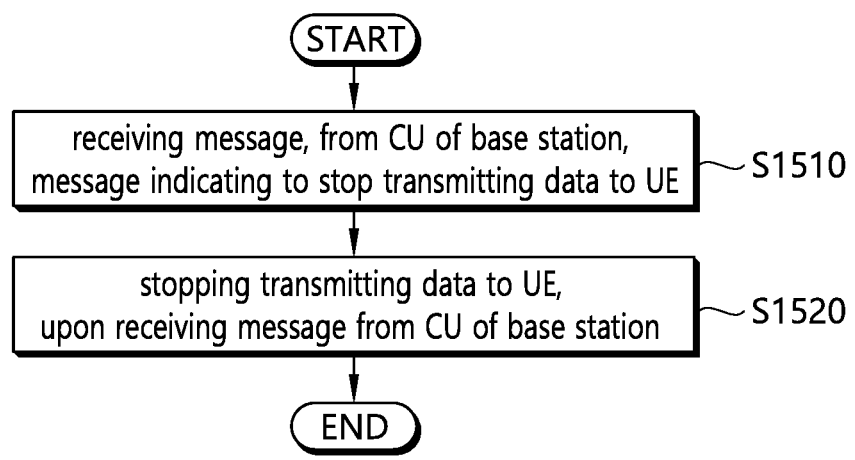
FIG. 15 is a block diagram of a method in which a source DU of a base station stops transmitting data to a UE according to an embodiment of the present invention.

FIG. 15 is a block diagram of a method in which a source DU of a base station stops transmitting data to a UE according to an embodiment of the present invention.

Referring to FIG. 15, in step S1510, the source DU of the base station may receive from a central unit (CU) a message indicating to stop transmitting data to the UE. The CU may be a logical node which hosts a radio resource control (RRC), service data adaptation protocol (SDAP), and packet data convergence protocol (PDCP) layer of the base station, and the DU may be a logical node which hosts a radio link control (RLC), media access control (MAC), and physical (PHY) layer of the base station. The message may be a UE context modification request message.

In step S1520, upon receiving the message from the CU of the base station, the source DU of the base station may stop transmitting data to the UE.

In addition, the source DU of the base station may transmit, to the CU of the base station, information on unsuccessfully transmitted downlink data to the UE from the source DU of the base station. The information on the downlink data may be information on a lost protocol data unit (PDU). The information on the downlink data may be the highest PDCP PDU sequence number successfully delivered in sequence to the UE among those PDCP PDUs received from the CU of the base station. The information on the downlink data may be a PDCP PDU sequence number corresponding to the lost RLC PDU. The information on the downlink data may be included in a downlink data delivery status frame. The downlink data may be retransmitted to a target DU of the base station with respect to each bearer by the CU of the bae station on the basis of the information on the downlink data.

In addition, the source DU of the base station may receive a measurement report message from the UE. Further, the source DU of the base station may transmit an uplink RRC transport message including the measurement report message to the CU of the base station. If the CU of the base station determines to change a source DU of the base station for the UE on the basis of the measurement report message included in the uplink RRC transport message, the message indicating to stop transmitting data to the UE may be received from the CU of the base station.

In addition, the source DU of the base station may transmit an RRC connection reconfiguration message to the UE, upon receiving the message from the CU of the base station.

Figure 16:
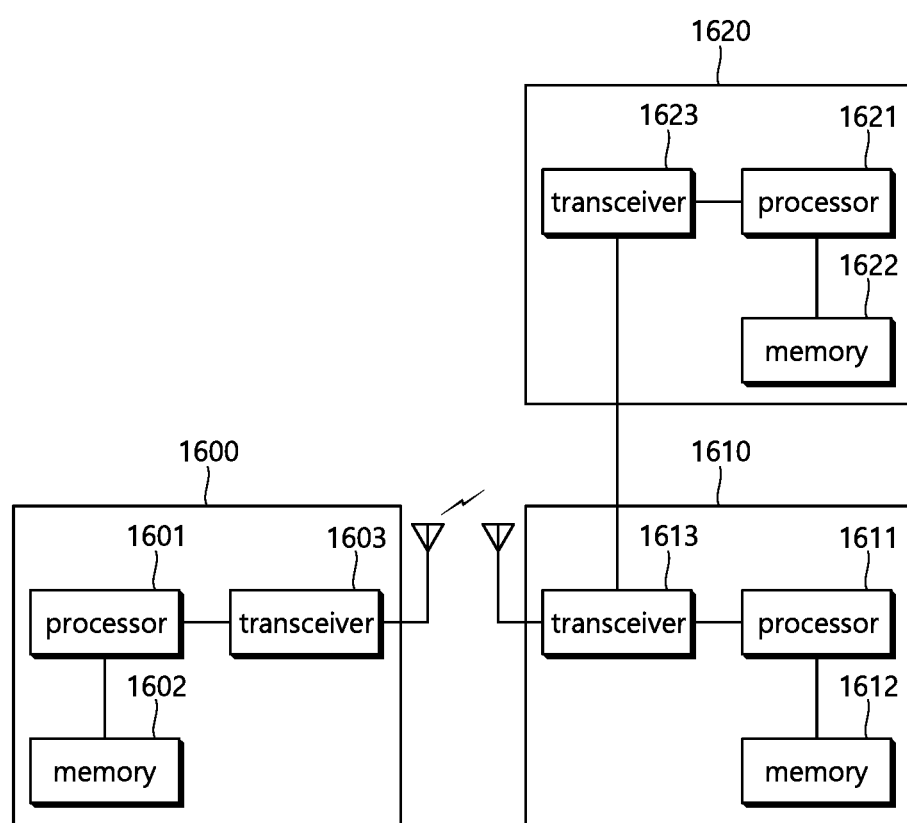
FIG. 16 is a block diagram illustrating a wireless communication system according to the embodiment of the present invention.

FIG. 16 is a block diagram illustrating a wireless communication system according to the embodiment of the present invention.

A UE 1600 includes a processor 1601, a memory 1602 and a transceiver 1603. The memory 1602 is connected to the processor 1601, and stores various information for driving the processor 1601. The transceiver 1603 is connected to the processor 1601, and transmits and/or receives radio signals. The processor 1601 implements proposed functions, processes and/or methods. In the above embodiment, an operation of the user equipment may be implemented by the processor 1601.

A DU of a base station 1610 includes a processor 1611, a memory 1612 and a transceiver 1613. The memory 1612 is connected to the processor 1611, and stores various information for driving the processor 1611. The transceiver 1613 is connected to the processor 1611, and transmits and/or receives radio signals. The processor 1611 implements proposed functions, processes and/or methods. In the above embodiment, an operation of the DU may be implemented by the processor 1611.

A CU of the base station 1620 includes a processor 1612, a memory 1622 and a transceiver 1623. The memory 1622 is connected to the processor 1621, and stores various information for driving the processor 1621. The transceiver 1623 is connected to the processor 1621, and transmits and/or receives radio signals. The processor 1621 implements proposed functions, processes and/or methods. In the above embodiment, an operation of the CU may be implemented by the processor 1621.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for a source distribution unit (DU) of a base station in a wireless communication system, the method comprising:
performing data transmission to a wireless device;
initiating mobility of the wireless device from the source DU to a target DU of the base station within a central unit (CU) of the base station;
receiving, from the CU, a message including information related to stopping the data transmission to the wireless device;
upon receiving the message from the CU, stopping the data transmission to the wireless device and transmitting a radio resource control (RRC) reconfiguration message to the wireless device; and
transmitting, to the CU, information related to downlink data unsuccessfully transmitted to the wireless device,
wherein RRC packet data convergence protocol (PDCP) layers of the base station are located in the CU, and
wherein radio link control (RLC), medium access control (MAC), and physical (PHY) layers of the base station are located in the source DU and the target DU.

2. The method of claim 1, wherein the information related to the downlink data includes information related to a lost protocol data unit (PDU).

3. The method of claim 1, wherein the information related to the downlink data includes the highest PDCP protocol data unit (PDU) sequence number successfully delivered in sequence to the wireless device among those PDCP PDUs received from the CU.

4. The method of claim 1, wherein the information related to the downlink data includes a PDCP protocol data unit (PDU) sequence number related to a lost RLC PDU.

5. The method of claim 1, wherein the information related to the downlink data is included in a downlink data delivery status frame.

6. The method of claim 1, wherein the downlink data is retransmitted to the target DU with respect to each bearer by the CU based on the information related to the downlink data.

7. The method of claim 1, further comprising:
receiving a measurement report message from the wireless device; and
transmitting an uplink RRC transport message including the measurement report message to the CU.

8. The method of claim 7, wherein the message is received from the CU upon the CU determining the mobility of the wireless device from the source DU to the target DU based on the measurement report message included in the uplink RRC transport message.

9. The method of claim wherein the message is a user equipment (UE) context modification request message.

10. The method of claim 1, wherein the message is received from the CU upon the CU receiving a secondary gNB (SgNB) modification request message from a master eNB (MeNB).

11. A source distribution unit (DU) of a base station in a wireless communication system, the source DU comprising:
a memory;
a transceiver; and
a processor operatively connected to the memory and the transceiver,
wherein the source DU is configured to:
perform data transmission to a wireless device;
initiate mobility of the wireless device from the source DU to a target DU of the base station within a central unit (CU) of the base station;
receive, from the CU, a message including information related to stopping the data transmission to the wireless device;
upon receiving the message from the CU, stop the data transmission to the wireless device and transmit a radio resource control (RRC) reconfiguration message to the wireless device; and
transmit, to the CU, information related to downlink data unsuccessfully transmitted to the wireless device,
wherein RRC packet data convergence protocol (PDCP) layers of the base station are located in the CU, and
wherein radio link control (RLC), medium access control (MAC), and physical (PHY) layers of the base station are located in the source DU and the target DU.

* * * * *